Patented Apr. 19, 1932

1,854,568

UNITED STATES PATENT OFFICE

WILHELM WALTER, OF COLOGNE-NIEHL, AND ERNST HARTMANN AND HEINRICH TEGTMEYER, OF DORMAGEN, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

CONCENTRATION OF ALIPHATIC CARBOXYLIC ACIDS

No Drawing. Application filed February 9, 1929, Serial No. 338,890, and in Germany February 15, 1928.

The present invention relates to a process of recovering water-soluble aliphatic carboxylic acids from their aqueous solutions.

It is known to be very difficult to separate liquid aliphatic carboxylic acids and water by one simple fractional distillation. Usually a whole series of operations is necessary, requiring much time, apparatus and expenditure of steam.

In accordance with the present invention, the separation of the water-soluble aliphatic carboxylic acids, containing more than two carbon atoms, from water is performed in a very easy, smooth manner and practically quantitatively by adding a halogenated aliphatic hydrocarbon which is liquid at normal temperature, say at about 20° C., such as ethylenebromide, chloroform, dichloroacetylene, dichloroethylene, methylenechloride, tetrachloromethane, trichloroethylene and the like, to the above mentioned carboxylic acids to be concentrated and fractionally distilling this mixture. The quantity of the halogenated aliphatic hydrocarbon may be varied within the widest limits, generally we add about 50%, calculated on the amount of the aqueous carboxylic acid, but the process may be carried out with the addition of less or more, say about 10% or about 100%, without departing from the spirit of our invention. The halogenated hydrocarbon distills off together with the water and a very small quantity of the carboxylic acid. If necessary, the process is carried out repeatedly, until concentrated aliphatic fatty acid remains in the distillation apparatus.

A particularly advantageous mode of carrying out the process consists in separating the mixture of the halogenated hydrocarbon and water, which distills over, into its components in an automatic apparatus and returning the halogen hydrocarbon continuously to the aqueous aliphatic acid to be concentrated. Moreover, by causing new quantities of the fatty acid which is to be concentrated to run in continuously as the water distills off, and by removing the concentrated acid formed continuously from the distillation vessel, the process can be made a continuous one.

The following examples illustrate our invention, without limiting it thereto:

*Example 1.*—1000 kgs. of a 30% propionic acid are distilled with the addition of 500 kgs. of dichloroethylene in a rectifying apparatus provided with a column and a dephlegmator, the dichloroethylene being continually returned to the distillation vessel. After a few hours, the water, which only contains traces of propionic acid, is distilled off. The dichloroethylene is then no longer caused to flow back, but is likewise distilled off, the propionic acid remaining behind with an almost quantitative yield and of nearly 100% purity.

*Example 2.*—1000 kgs. of a 60% butyric acid are distilled with 500 kgs. of trichloroethylene, as described in Example 1. The water passes off with the trichloroethylene with a low butyric acid content. After distilling off the trichloroethylene, a nearly 100% butyric acid remains behind with an almost quantitative yield.

*Example 3.*—1000 kgs. of a 10% isobutyric acid are distilled with 500 kgs. of chloroform as described in Example 1. Thus is obtained an anhydrous isobutyric acid with an almost quantitative yield.

We claim:

1. In a process of removing the water from aqueous solutions of water-soluble aliphatic carboxylic acids containing more than two carbon atoms, the steps which comprise adding a halogenated aliphatic hydrocarbon which is liquid at about 20° C. to the aqueous solution of the water-soluble aliphatic carboxylic acid and fractionally distilling the mixture to obtain a distillate containing water and the chlorinated hydrocarbon.

2. In a process of removing the water from aqueous solutions of water-soluble aliphatic carboxylic acids containing more than two carbon atoms, the steps which comprise adding a halogenated aliphatic hydrocarbon which is liquid at about 20° C. to the aqueous solution of the water-soluble aliphatic carboxylic acid, fractionally distilling the mixture to obtain a distillate containing water and the chlorinated hydrocarbon, separating the halogenated aliphatic hydrocarbon from the distillate, re-introducing it into the said aliphatic carboxylic acid solution and repeating the steps of fractional distillation, separation and re-introduction until the water has been almost completely removed from the said aliphatic carboxylic acid.

3. In a process of removing the water from aqueous solutions of water-soluble aliphatic carboxylic acids containing more than two carbon atoms, the steps which comprise adding a halogenated aliphatic hydrocarbon which is liquid at about 20° C. to the aqueous solution of the water-soluble aliphatic carboxylic acid, fractionally distilling the mixture to obtain a distillate containing water and the chlorinated hydrocarbon, separating the halogenated aliphatic hydrocarbon from the distillate, re-introducing it into the said aliphatic carboxylic acid solution and repeating the steps of fractional distillation, separation and re-introduction until the water has been almost completely removed from the said aliphatic carboxylic acid and then distilling off the halogenated aliphatic hydrocarbon from the said aliphatic carboxylic acid.

4. A process in accordance with claim 1, wherein about one part by weight of a halogenated aliphatic hydrocarbon is added to two parts by weight of a water-soluble aliphatic acid.

5. A process in accordance with claim 2, wherein about one part by weight of a halogenated aliphatic hydrocarbon is added to two parts by weight of a water-soluble aliphatic acid.

6. A process in accordance with claim 3, wherein about one part by weight of a halogenated aliphatic hydrocarbon is added to two parts by weight of a water-soluble aliphatic acid.

7. A process in accordance with claim 1, wherein the halogenated aliphatic hydrocarbon consists of dichloroethylene.

8. A process in accordance with claim 2, wherein the halogenated aliphatic hydrocarbon consists of dichloroethylene.

9. A process in accordance with claim 3, wherein the halogenated aliphatic hydrocarbon consists of dichloroethylene.

10. In a process of removing the water from aqueous solutions of water-soluble aliphatic carboxylic acids containing more than two carbon atoms, the step which comprises adding one part by weight of dichloroethylene to two parts by weight of the aqueous solution of the aliphatic carboxylic acid and fractionally distilling the mixture to obtain a distillate containing water and the chlorinated hydrocarbon.

11. In a process of removing the water from aqueous solutions of water-soluble aliphatic carboxylic acids containing more than two carbon atoms, the step which comprises adding one part by weight of dichloroethylene to two parts by weight of the aqueous solution of the aliphatic carboxylic acid, fractionally distilling the mixture to obtain a distillate containing water and the chlorinated hydrocarbon, separating the halogenated aliphatic hydrocarbon from the distillate, re-introducing it into the said aliphatic carboxylic acid solution and repeating the steps of fractional distillation, separation and re-introduction until the water has been almost completely removed from the said aliphatic carboxylic acid.

12. In a process of removing the water from aqueous solutions of water-soluble aliphatic carboxylic acids containing more than two carbon atoms, the step which comprises adding one part by weight of dichloroethylene to two parts by weight of the aqueous solution of the aliphatic carboxylic acid, fractionally distilling the mixture to obtain a distillate containing water and the chlorinated hydrocarbon, separating the halogenated aliphatic hydrocarbon from the distillate, re-introducing it into the said aliphatic carboxylic acid solution and repeating the steps of fractional distillation, separation and re-introduction until the water has been almost completely removed from the said aliphatic carboxylic acid and then distilling off the halogenated aliphatic hydrocarbon from the said aliphatic carboxylic acid.

13. A process in accordance with claim 10, wherein the water-soluble aliphatic carboxylic acid consists of propionic acid.

14. A process in accordance with claim 11, wherein the water-soluble aliphatic carboxylic acid consists of propionic acid.

15. A process in accordance with claim 12, wherein the water-soluble aliphatic carboxylic acid consists of propionic acid.

In testimony whereof we have hereunto set our hands.

WILHELM WALTER. [L. S.]
ERNST HARTMANN. [L. S.]
HEINRICH TEGTMEYER. [L. S.]